Oct. 30, 1951     C. M. HINES     2,573,442
CIRCUIT INTEGRITY INDICATING SYSTEM Filed July 2, 1949     3 Sheets-Sheet 1

INVENTOR.
CLAUDE M. HINES
BY
Frank E. Miller
ATTORNEY

Oct. 30, 1951          C. M. HINES          2,573,442

CIRCUIT INTEGRITY INDICATING SYSTEM

Filed July 2, 1949          3 Sheets-Sheet 3

FIG.3

INVENTOR.
CLAUDE M. HINES
BY
*Frank E. Miller*
ATTORNEY

Patented Oct. 30, 1951

2,573,442

UNITED STATES PATENT OFFICE 2,573,442

CIRCUIT INTEGRITY INDICATING SYSTEM

Claude M. Hines, Verona, Pa., assignor to Westinghouse Air Brake Company, a corporation of Pennsylvania Application July 2, 1949, Serial No. 102,836

16 Claims. (Cl. 177—311)

This invention relates to a circuit checking means, and more particularly, to an apparatus adapted to be associated with the control circuits of electro-pneumatic brake apparatus employed on a train of cars and to selectively signal the integrity or lack of integrity of the said control circuits or other electrical devices associated therewith.

The majority of modern-day high speed trains are equipped with a combination of two brake control systems operative alternatively and independently of each other. This type of brake control equipment usually includes an electro-pneumatically controlled straight-air braking system and an entirely pneumatically controlled automatic braking system, each of which is controlled by the same control lever mounted on a single brake control valve device. Such brake control valve device is shown and described in Patent No. 2,106,483 of E. E. Hewitt which is assigned to the assignee of this application.

The automatic brake system consists of the usual brake pipe extending throughout the train with a branch pipe leading from said brake pipe to a brake control valve device on each car of the train. The said brake pipe is charged with fluid under pressure and it is the variation of pressure of said fluid which causes the operation of the brake control valve device on each car to effect either a brake application or a brake release as desired. The variation of fluid pressure in the brake pipe travels by wave action, at a speed somewhat less than that of sound in air, from the point of origin, usually the locomotive, to all other parts of the train. This wave action effects a serial action of the brake control valve devices on the cars for sequentially applying or releasing the brakes on successive cars of a train. The serial brake action results in a slack action between the cars of the train accompanied in some instances by shock and jerking of the cars which is undesirable especially in the case of passenger trains.

The electro-pneumatic straight-air brake control system, which makes use of electricity to control the brake operation, produces practically simultaneous and uniform control of the brakes on all cars. The simultaneous and uniform action of the brakes as a result of instantaneous transmission of the electrical control impulses throughout the train, minimizes the slack action between the cars and produces faster applications of the brakes, thereby enabling shorter stopping distances than may be obtained with the automatic brake control system.

For convenience, the electro-pneumatic straight-air brake control system will hereinafter be referred to as the straight-air brake system, and the wholly pneumatically controlled brake system will be referred to as the automatic brake system.

Because of the advantages inherent in the straight-air brake system over the automatic brake system, the straight-air brake system is customarily employed in preference to the latter system. The automatic brake system thus serves as an alternate brake system to be used in most instances in the event of failure or a faulty condition of the straight-air brake system.

The present straight-air brake systems employ control wires or circuits which extend from the locomotive or control car at the head end of the train through all cars in the train, suitable electric couplers being provided between the cars for serially connecting each corresponding car wire into one continuous conductor through the train. By reason of flying ballast, rain, snow and the lost motion between the individual cars, the electric couplers are vulnerable to faults, such as open circuits, shorted or grounded circuits which may cause failure of the straight-air brake system to function either partially or even completely. If the nature and location of the fault can be determined, it is in most cases possible to restore the straight-air brake system promptly to its full service-ability without the loss of its utility.

The straight-air brake system usually includes two magnet valves, commonly referred to as the application magnet valve and the release magnet valve, on each car of the train. The release magnet valves are first operated upon the initiation of a brake application, to close a port to atmosphere from a pipe extending from car to car and throughout the train and commonly known as the straight-air pipe. The application magnet valves are next operated to admit fluid under pressure from a suitable source local to each car, to the straight-air pipe. The fluid pressure thus uniformly and simultaneously established throughout the length of the straight-air pipe controls, either directly or indirectly, the fluid pressure established in the brake cylinder on all cars in the train and thereby causes a uniform degree of brake application to be simultaneously effected on all cars.

A failure of a small percentage of the application magnet valves to supply fluid under pressure to the straight air pipe during a straight-air application of the brakes, reduces the rate of build-up of braking forces, but does not alter the degree of the application for the reason that the straight-air pipe is continuous and the operative application magnet valves are effective to establish the proper straight-air pipe pressure.

The failure of a small percentage of the release magnets to operate during a straight-air application to close their individual exhaust communications from the straight-air pipe to the atmosphere is, however, a matter of grave concern. In such cases, not only is the rate of development of the application retarded, but also the degree of application attainable is lowered and the available fluid under pressure from the source of supply, vital to safe operation of the brake equipment, is concurrently released to atmosphere. It is thus essential that the operator be made promptly aware of the faulty condition of the electro-pneumatic brake control equipment in order to avoid a loss of fluid pressure supply. For safety reasons also, it is undesirable to lose the time necessary to determine a faulty straight-air brake equipment by attempting a straight-air application before resorting to the automatic brake system.

The desirability of continuously indicating the integrity or lack of integrity of the electrical control circuits and of the magnet valve windings in electro-pneumatic brake control systems has been previously recognized and various means and methods have been proposed and employed for this purpose. One such method is described in my prior copending application Serial No. 25,208, filed May 5, 1948.

The copending application Serial No. 25,208 provides an apparatus adapted for use in conjunction with electro-pneumatic brake control systems and constructed on the Wheatstone Bridge principle with the application magnet windings and the release magnet windings each serving as one branch of individual Wheatstone Bridge arrangements, said bridge arrangements being automatically intentionally balanced and unbalanced periodically so long as the integrity of the electro-pneumatic brake control system is unimpaired. The apparatus described in the said application Serial No. 25,208 provides for checking the integrity of the brake control circuits only while the brakes are released.

It is an object of my present invention to provide an improved circuit-checking apparatus of the type disclosed in the above-mentioned application, characterized in that it includes means for detecting faults in the electrical control circuits, or in the windings of magnet valves associated therewith, in such a manner as to indicate the location of any faults in the system not only while the brakes are released, but also while the brakes are applied.

It is another object of my present invention to provide an improved circuit-checking apparatus of the type referred to in the foregoing object and further characterized in that it includes one means for detecting faults in the electrical control circuits while the brakes are released and a second means for detecting faults in the electrical control circuits while the brakes are applied.

Another object of my invention is to provide an improved circuit-checking apparatus, of the type referred to in the foregoing objects, characterized in having novel means for disconnecting said bridge arrangements from and reconnecting them to the brake control circuits when the brakes are applied and released, respectively.

In the circuit-checking apparatus disclosed in the above-mentioned copending application, the certainty of the apparatus giving a correct indication of the integrity of the control circuits being checked when there is no fault in the said control circuits depends upon the Wheatstone Bridge arrangements being automatically intentionally balanced and unbalanced periodically. However, if a brake application is prolonged, the release magnet windings may become heated by the energizing current and consequently the resistance of these windings may increase enough to effect an unintentional unbalance of the bridge arrangement when the control circuits are reconnected to the bridge arrangement during a brake release. It is an object of my present invention to provide an improved circuit-checking apparatus of the type mentioned above, for preventing the occurrence of such faulty indications and characterized in that it includes means for separately electrically heating a branch of the Wheatstone Bridge other than that containing the release magnet windings while the release magnet windings are energized during a brake application. By thus uniformly varying the resistance of corresponding arms of the Wheatstone Bridge arrangement, unintentional unbalance of the bridge arrangement is prevented.

In the circuit-checking apparatus of my above-mentioned copending application, the automatic intermittent unbalance of the Wheatstone Bridge arrangements is produced by short-circuiting first one branch and then another branch of the bridge.

Another object of my invention is to provide an improved circuit-checking apparatus of the type referred to in the foregoing objects and characterized in that it provides maximum sensibility to automatically intentionally unbalance the bridge arrangements periodically by short-circuiting first two opposite branches and then two other opposite branches of the bridge.

The above objects together with other objects which will be made apparent in the subsequent description of my invention, are attained by apparatus to be hereinafter described when read in connection with the accompanying drawings, wherein Figs. 1, 2 and 3 when taken together, constitute a diagrammatic view showing a simplified brake control equipment for railway cars and trains embodying my novel circuit-checking and signalling system.

While a simplified brake control equipment is shown in the drawings for the purpose of illustrating the nature and utility of my novel circuit-checking system, it will be understood that the apparatus illustrated and described herein is intended to and may be applied to and function with conventional brake control equipment as well as various other types of control circuits.

Figure 1:
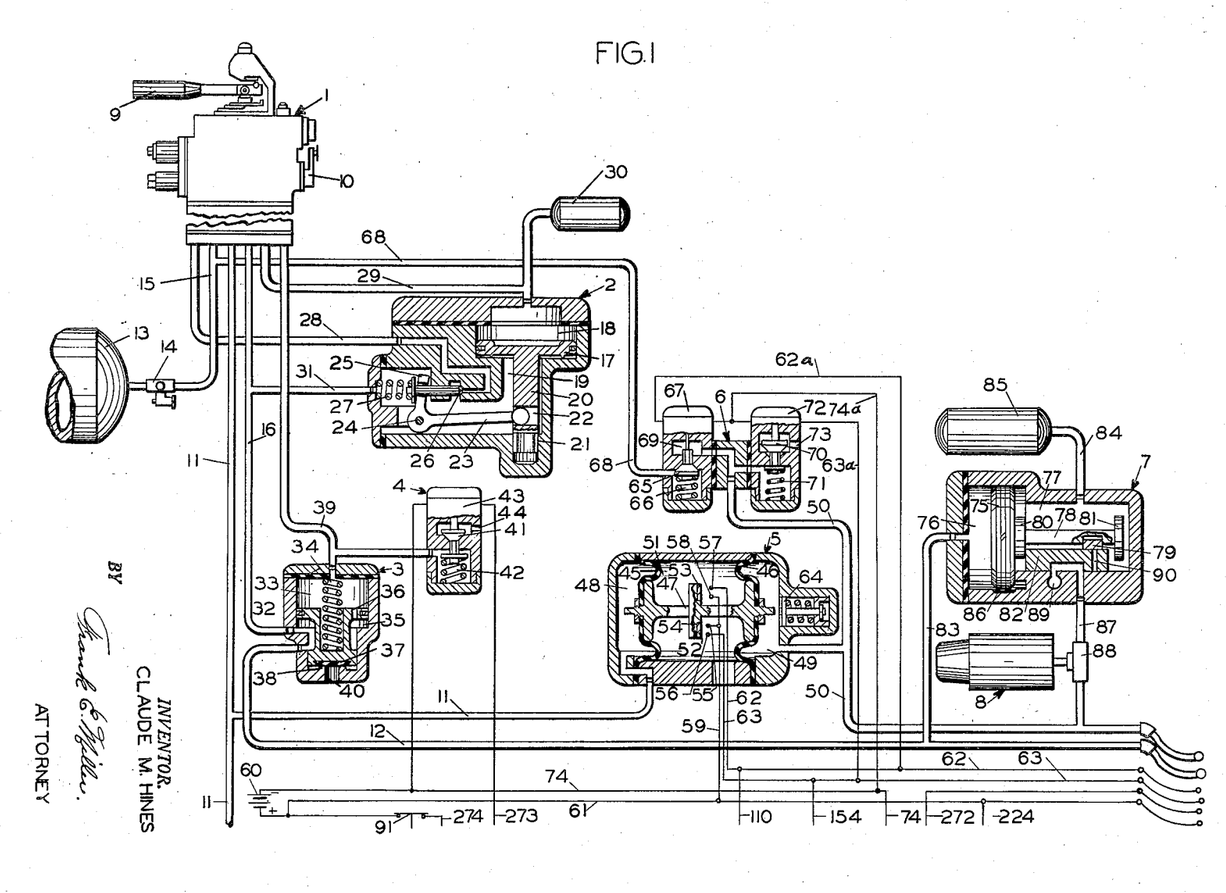

The brake control equipment shown in Fig. 1 is that required for the locomotive or traction vehicle of a train, and may include a brake valve 1, an equalizing discharge valve 2, a vent valve device 3, a magnet valve device 4, a master switch device 5, an application and release magnet valve device 6, an automatic brake control device 7 and a brake cylinder 8.

The brake valve device 1 is preferably the same as, or similar to, that described in Patent No. 2,106,483 of E. E. Hewitt dated January 25, 1938 which is assigned to the assignee of this application, to which reference may be had for a detailed description of structure. It is not essential to the understanding of the present invention that this brake valve device be either fully shown or described in detail, and for that reason it is deemed necessary to describe briefly only those functions of the brake valve device helpful to an understanding of the operation of the brake equipment illustrated.

The brake valve device 1 is preferably operated by movement of a handle 9, in a single application zone, to control all applications of the brake. In order to accomplish this, the brake valve is provided with a selector 10, which in one of its two positions conditions the brake valve for straight-air brake operation, and which, in the other of its two positions, conditions the brake valve for automatic brake operation.

When the selector 10 is in the straight-air position, and the handle 9 is in release position, the straight-air control pipe 11 is in communication with the atmosphere, through a port in the brake valve while the brake pipe 12 is being maintained charged from a main reservoir 13, under the control of a feed valve 14 by way of a feed valve pipe 15 and a branch pipe 16. A straight-air application of the brakes is effected by moving the handle 9 to any desired position in the application zone, whereupon comunication between the control pipe 11 and the atmosphere is closed, and fluid under pressure is supplied to this control pipe to a degree dependent upon the degree of movement of the handle 9 into the application zone. During this movement of the handle 9, the brake pipe 12 continues to be maintained charged from the main reservoir 13 to a pressure regulated by the adjusted setting of the feed valve 14.

When the selector 10 is in the automatic position, and the handle 9 is in the release position, the straight-air control pipe 11 is connected to the atmosphere and the brake pipe is charged as before described. When it is desired to effect an automatic application of the brakes, the handle 9 is first moved to a first service, or slack-gathering position, in the case of long trains, and then to full service position. If the train is short in length the brake valve handle may be moved to the full service position in the first instance. In the first service position of the brake valve handle a slow rate of reduction of brake pipe pressure results, and in the full service position, brake pipe pressure continues to be reduced at a service rate until the handle is returned to the lap position. The degree of reduction in the brake pipe pressure is thus controlled according to the duration of time in which the handle 9 remains in the full service position. During this manipulation of the handle, the straight-air control pipe 11 continues to be connected to atmosphere.

Regardless of what position the selector 10 is in, if the handle 9 is turned to an emergency position, the brake pipe 12 will be vented to the atmosphere directly, by the operation of a separate valve device within the brake valve.

The functioning of the brake valve 1 will be more fully understod from the description of the equipment operation which will follow hereinafter.

The equalizing discharge valve device 2 is embodied in a casing containing a piston 17 subject on its upper side to the pressure of fluid in chamber 18 and on its lower side to the pressure of fluid in a chamber 19. Attached to the piston 17 is a stem 20 having one end thereof slidable in a bore 21. The stem 20 is recessed at 22 to receive the end of a lever 23. The lever 23 is pivotally mounted on a pin 24 attached to the casing and has an extension 25 for operating an exhaust valve 26. The exhaust valve 26 is normally biased to a seated position by a spring 27, but upon counter-clockwise movement of the lever 23 about pin 24, the vent valve 26 is unseated in opposition to the force of spring 27 to open the communication between the chamber 19 and an equalizing discharge passage 28 leading to the brake valve device. The chamber 18 is connected by a pipe 29 to the brake valve device 1 and to an equalizing reservoir 30 by a branch of pipe 29.

Operation of the equalizing discharge valve device is effected by reducing the pressure of fluid in chamber 18 and in the equalizing reservoir 30, whereupon the piston 17 is shifted upwardly due to the unbalancing of fluid pressures in the chambers 18 and 19. The upward movement of the piston 17 rotates the lever 23 in a counter-clockwise direction about the pin 24 to unseat the vent valve 26. As will appear more clearly hereinafter, unseating of the exhaust valve 26 allows fluid under pressure in chamber 19 to flow to atmosphere until the presure therein becomes slightly less than the pressure in chamber 18 and in the equalizing reservoir 30, whereupon the piston 17 is returned by the unbalanced fluid pressures to the position shown wherein the exhaust valve 26 is seated by its spring 27. Since the chamber 9 is connected to the brake pipe by way of a branch pipe 16, pipe 31 and vent valve device 3, as will be more fully described, it follows that any reduction of pressure in chamber 19 will effect a corresponding reduction of the pressure in the brake pipe and that the brake pipe pressure reduction can be controlled in accordance with the degree of reduction of the pressure in the equalizing reservoir and in chamber 18.

The vent valve device 3 comprises a casing containing a piston 32, subject on the one side to the combined pressures of fluid in chamber 33 which is in continuous communication with pipe 39, and that of a spring 34, and subject on the other side to the pressure of fluid in a chamber 35, connected at all times to the branch pipe 16. A restricted port 36 in the piston 32 permits the fluid pressure in chamber 33 to normally equalize with that in chamber 35 so that the spring 34 is effective to shift the piston 32 to its lower or normal position. Attached to the piston 32 is a valve 37 which is held on a seat rib 38 by the force of the spring 34 when the pressure in the two chambers 33 and 35 is equalized.

In the lower-most position of the piston 32, a communication is established between the brake pipe 12 and the pipe 16 leading to the brake valve. The chamber 33 above the piston 32 is connected by pipe 39 to the brake valve device 1 and by a branch of pipe 39 to the magnet valve device 4. Upon the release of pressure in the pipe 39 and in the chamber 33, the overbalancing pressure in the chamber 35 shifts the piston 32 to its upper position, wherein the communication between the pipe 16 and brake pipe 12 is cut off and the brake pipe 12 is connected past the valve 37 and the seat rib 38 to the atmosphere through a large port 40. This rapidly reduces the brake pipe pressure, to cause an emergency application of the brakes, as will hereinafter be described.

The magnet valve device 4 is embodied in a casing having therein a valve 41 which is urged toward an unseated position by a spring 42 and actuated to a seated position upon energization of an electro-magnet 43. When the electro-magnet 43 is deenergized, the spring 42 unseats valve 41 to establish a communication between the branch of pipe 39 and the atmosphere through a port 44. As long as the electro-magnet 43 is energized, the valve 41 is held to its seat and the communication between the pipe 39 and the atmosphere through port 44 is closed.

The master switch device 5 comprises a casing containing two flexible diaphragms 45 and 46, disposed therein in spaced coaxial relationship and connected by a stem 47. At the outer side of the diaphragm 45 is a chamber 48 connected to the straight-air control pipe 11. On the outer side of diaphragm 46 is a chamber 49 that is connected to a straight-air pipe 50. The two diaphragms 45 and 46 and the casing define a chamber 51 between the diaphragms through which the stem 47 extends.

Two movable contact members 52 and 53 are disposed in chamber 51 and rigidly secured to the stem 47 by an insulating spool 54, the contact member 52 being known as the release contact member and the contact member 53 being known as the application contact member. Both contact members are adapted to move with movement of the stem 47 from the position shown toward the right, that is, in the direction of chamber 49, to first effect an engagement of the release contact member 52 with a pair of resilient contact members 55 and 56. A further movement of the stem to the right effects engagement of the application contact member 53 with a pair of resilient contact members 57 and 58. The resilient contact members 55, 56, 57 and 58 yield under pressure to permit continued movement of the spool 54 and the contact members 52 and 53 after engagement with the resilient contact members. The resilient members 55 and 58 are connected to a wire 59 which is connected to the positive terminal of a supply battery 60 by a supply wire 61. The resilient contact member 56 is connected to a release control wire 63 hereinafter referred to as the release wire. Engagement of the contact members 55 and 56 by the contact member 52 results in energization of the release wire. The resilient contact member 57 is connected to an application control wire 62, hereinafter referred to as the application wire. Engagement of the contact members 57 and 58 by the application contact member 53 results in energization of the application wire 62.

Contained in the chamber 49 is a spring supported stop member 64 which is engaged by the stem 47 at a point in the travel of the stem in which the release contact member 52 engages contact members 55 and 56 and before engagement of the application contact members 57 and 58 by contact member 53. This spring stop serves to stabilize the switch device against any tendency of a pumping action and to define a so-called lap position thereof.

The application and release magnet valve device 6 comprises a casing containing a supply valve 65 normally urged into seated position by a spring 66 and actuated to an unseated position by energization of an electro-magnet 67. The supply valve 65 is effective when seated to interrupt communication between the feed valve pipe 15 by way of a branch pipe 68 and a chamber 69 in the application and release magnet valve device 6. When unseated, the supply valve 65 permits the flow of fluid under pressure from the branch pipe 68, past the valve 65 to the chamber 69 to which the straight-air pipe 50 is connected. Also disposed in the magnet valve device casing is a release valve 70 which is normally urged to an unseated position by a spring 71 to connect the straight-air pipe 50 to atmosphere via a port 73 and actuated into a seated position by energization of an electro-magnet 72.

One terminal of the electro-magnet 67 is connected by a branch wire 62a to the application wire 62 which extends through the train. The other terminal is connected by a branch wire 74a to a battery return wire 74 connected to the negative terminal of the supply battery 60.

One terminal of the electro-magnet 72 is connected by a branch wire 63a to the release control wire 63 which extends through the train. The other terminal of the electro-magnet 72 is connected by the branch wire 74a to the battery return wire 74. Energization of the application and release electro-magnets 67 and 72 is thus controlled by the master switch device 5 as will be explained hereinafter.

The automatic brake control device 7 comprises a casing having therein a piston 75 subject on one side to the pressure of fluid in a chamber 76, and on the other side to the pressure of fluid in chamber 77. The piston 75 is provided with a stem 78, which is recessed to receive, and to move with movement of the piston, a graduating slide valve 79. The stem 78 is further provided with collars 80 and 81 so spaced as to engage a main slide valve 82 between said collars with a slight amount of lost motion.

The chamber 76 is connected by a branch pipe 83 to the brake pipe 12. The chamber 77, in which is located the stem 78 and the slide valve 82, is connected by a branch pipe 84 to the auxiliary reservoir 85. The parts of this automatic brake control device are illustrated in what is known as the brake release position, in which the auxiliary reservoir 85 and the slide valve chamber 77 are charged with fluid under pressure from the brake pipe 12 by way of the branch pipe 83, chamber 76 and a feed groove 86, which in this position of the piston 75 connects the chambers 76 and 77. In this release position of the slide valve 82, a cavity in the slide valve connects a passage and pipe 87 leading to a double check valve 88, and to the brake cylinder 8 during an automatic brake application, to an atmospheric port 89 for the release of fluid pressure in the pipe 87 and the brake cylinder 8. With the brake pipe 12 and the auxiliary reservoir charged with fluid under pressure, a reduction of the brake pipe pressure effected as will hereinafter be described, at a rate sufficient to create the necessary pressure differential across the piston 75 causes the piston to be shifted to the left or in the direction of chamber 76. The initial movement of the piston and the graduating valve 79 uncovers a service port 90 in the main slide valve 82, the piston simultaneously closing the feed groove 86, and thereby cutting off communication between the chambers 76 and 77. The continued movement of the piston 75 by reason of the brake pipe reduction causes the collar 81 on the piston stem to engage the slide valve 82 and move it to a position in which the service port 90 registers with the port and pipe 87. Communication is thus established through which fluid under pressure is supplied from the auxiliary reservoir 85 past the valve element (not shown) of the double check valve 88 to the brake cylinder 8 to establish fluid pressure therein, thereby applying the brakes. As the auxiliary reservoir pressure is reduced by flow of fluid under pressure therefrom to the brake cylinder, in effecting the brake application, the unbalance of forces in effect across the piston 75 is diminished and when the auxiliary reservoir pressure is reduced slightly below the pressure in the brake pipe and connected chamber 76, the piston and the graduating valve will be moved in the right-hand direction, towards chamber 77, to a so-called "lap" position in which the graduating valve 79 covers the service port 90 and cuts off further supply of fluid under pressure through the communication between the auxiliary reservoir and the brake cylinder.

When fluid under pressure is again supplied to the brake pipe 12 for restoring the pressure therein as will hereinafter be described, the predominating force of brake pipe pressure over the auxiliary reservoir pressure will cause the piston 75 to move the main slide valve 82 into release position, in which it is shown, again connecting the brake cylinder to the atmospheric port 89 and opening the feed groove 86 to permit a recharge of the auxiliary reservoir.

The equipment just described is a simplified combined automatic and straight-air brake control equipment such as may be applied to the locomotive. For simplicity the brake control apparatus for the cars is not shown in the drawings, but it should be understood that the equipment on each car may include devices similar to the device on the locomotive such as an application and release valve device 6, an automatic brake control device 7, an auxiliary reservoir 85, and a brake cylinder 8. The automatic brake control device 7 on each car is connected by a pipe similar to pipe 84 to receive its supply of fluid pressure from the auxiliary reservoir on each car or from a separate supply reservoir charged from the brake pipe on the respective car.

The electro-magnets 67 and 72 on the cars are connected in a manner similar to that shown for the locomotive, namely to the application wire 62, release wire 63, and to a common return wire, all of which extend from the locomotive through each car to the last car of the train. The respective application and release magnet valves on the locomotive and all cars of the train are thus controlled simultaneously by selective control of energization of the application and release wires.

In order to better understand the nature and operation of my circuit-checking apparatus, a brief description of the operation of the electro-pneumatic brake control equipment thus far described will be helpful. Assuming that the main reservoir 13 is charged with fluid under pressure, and that the selector 10 is in the straight air operation position, the apparatus thus far described will operate as follows:

With the brake valve handle 9 in the release position, the fluid from the main reservoir 13 will flow, at a pressure regulated by the feed valve 14, through the usual rotary valve (not shown) of the brake valve 1 to the pipe 15, thence by way of the pipe 16 to the vent valve device 3 and the brake pipe 12. Fluid under pressure in brake pipe 12 flows by way of branch pipe 83 to chamber 76 at the face of piston 75 of the automatic brake control device 7 on the locomotive and similar devices on each of the cars in the train. With no pressure in the auxiliary reservoir, brake pipe pressure in chamber 76 will force the piston 75 to the position in which it is shown wherein the feed groove 86 is opened to allow communication from the chamber 76 to the chamber 77 and to the auxiliary reservoir 85. After sufficient charging time, the auxiliary reservoir 85 on the locomotive and all the cars of the train will be charged with fluid at a pressure equal to the brake pipe pressure as regulated by the feed valve 14. At the same time this equalizing of fluid pressures is occurring, fluid under pressure as regulated by the feed valve 14 is permitted to flow through a restricted port in the rotary valve of the brake valve 1 to pipe 29 leading to the equalizing reservoir 30 and to chamber 18 above the equalizing piston 17. With the brake pipe pressure, by way of pipe 31, active in chamber 19 below the equalizing piston 17, of equal value to the equalizing reservoir pressure in chamber 18, the weight of the piston 17 together with the force of spring 27 acting against the exhaust valve 26 will maintain the exhaust valve on its seat. In this release position of the brake valve handle 9, the straight-air control pipe 11 is connected through the self-lapping portion (not shown) of the brake valve 1 to the atmosphere. The brake cylinder 8 on the locomotive and on each car in the train attached to the locomotive may be connected to the atmosphere either through the pipe 87, the cavity in the slide valve 82 and port 89 in the control device 7, or may be connected through the straight-air pipe 50 to the magnet valve device 6 and thence to atmosphere by way of the unseated exhaust valve 70 and port 73 in the release magnet portion.

To effect straight-air application of the brakes, the handle 9 is moved from the release position into the application zone toward the full service position to an extent according to the desired degree of application of the brakes.

With the selector 10 in the straight-air operation position, the self-lapping portion of the brake valve device is operative to control the flow of fluid under pressure from the feed valve pipe 15 to the pipe 11 and thence to chamber 48 of the master switch device 5 to a value proportional to the degree of movement of the handle 9 into the application zone. Fluid under pressure in chamber 48 will cause the spool 54 to move to the right through the medium of the stem 47 thus closing the release contact member 52 against the contact members 55 and 56, and the application contact member 53 against the contact members 57 and 58, to in turn effect operation of the application and release magnet valve device 6, as before described, to establish a pressure in the straight-air pipe 50 equal to the pressure in pipe 11 and chamber 48. Since the straight-air pipe is connected by way of the double check valve 88 to the brake cylinder 8, it follows that fluid under pressure will be established in the brake cylinder equal to the pressure of fluid in the straight-air pipe.

The degree of application may be increased by moving the brake valve handle further away from release position into the application zone, and may be decreased by moving the handle back toward the release position.

When it is desired to effect a release of the brakes, the brake valve handle 9 is placed in its release position whereupon fluid supplied to pipe 11 and to chamber 48 is released to the atmosphere by the self-lapping portion of the brake valve. Fluid pressure in the straight-air pipe 50, and hence in the brake cylinders, is effective in chamber 49 to effect the opening of the release contact members 55 and 56 from the contact member 52 and the application contact members 57 and 58 from the contact member 53 by movement of the spool 54 to the left thereby controlling the application and release magnet valve device 6 to release the straight-air pipe and brake cylinder pressures to the atmosphere.

When it is desired to effect an application of the brakes by automatic operation, the selector 10 is first moved to the "automatic" position. Then with the brake pipe and auxiliary reservoirs throughout the train charged with fluid under a pressure regulated by the setting of the feed valve 14, as before described, the handle 9 is moved from the release position through a "lap" position into the service position. In this service position of the handle 9, the brake valve operates in the usual manner to disconnect the branch pipe 16 and the equalizing reservoir pipe 29 from the feed valve pipe 15, also to connect the equalizing discharge pipe 28 to the atmosphere and the equalizing reservoir to exhaust through a restricted passage (not shown) in the brake valve. Fluid under pressure in the equalizing reservoir 30 and in chamber 18 of the equalizing discharge valve device 2 thus reduces to atmospheric pressure at a controlled rate during all the time the handle 9 is in the service position. As soon as the desired degree of reduction of equalizing reservoir pressure is effected, the brake valve handle 9 is returned manually to the "lap" position. The reduction in fluid pressure in chamber 18 results in an unbalance of pressures across piston 17 with the result the piston moves upwardly unseating valve 26 thereby reducing brake pipe pressure to the atmosphere until the brake pipe pressure is reduced to a pressure equal to the reduced value of the equalizing reservoir pressure.

When a reduction in brake pipe pressure is effected, a corresponding reduction of fluid pressure takes place in chamber 76 of the brake control device 7 on the locomotive and each car of the train. The unbalance of pressures on the piston 75 causes said piston to shift to the left to the service position which in turn causes graduating valve 79 and slide valve 82 to move to the right through the medium of stem 78 and collar 81 so that fluid pressure from the auxiliary reservoir is connected through the slide valve port 90 to the brake cylinder 8 until auxiliary reservoir fluid pressure is reduced to a fluid pressure corresponding to slightly less than brake pipe pressure, when the piston 75 will be caused, by the unbalance of fluid pressures acting on it, to move to the right to the lap position wherein the graduating valve 79 covers the service port 90 to cut off further flow of auxiliary reservoir pressure to the brake cylinder.

It will be obvious that the degree of the brake application is controlled according to the degree of reduction in the equalizing reservoir pressure and that a graduated control of the brakes is obtainable by proper manipulation of the brake valve handle.

To effect a release of the brakes following an automatic application, the brake valve handle 9 is moved to the release position in which the brake pipe pressure is restored from the main reservoir in a manner similar to that explained previously in the charging of the equipment. The increasing brake pipe pressure is effective in the automatic brake control device 7 to force the piston 75 to the release position in which the auxiliary reservoir is recharged with fluid under pressure from the brake pipe through feed groove 86, chamber 77, and pipe 84, and the brake cylinder pressure is connected to the atmosphere by way of double check valve 88, pipe 87 and port 89.

An emergency application of the automatic brakes may be effected manually by movement of the brake valve handle to emergency position, in which position the automatic brake valve is positioned in such a manner as to connect the pipe 16 to the atmosphere through a large port (not shown) in the brake valve, or by removal of the operator's hand from the brake valve handle in the well-known manner of "deadman" control. In this latter instance, fluid pressure is released from pipe 39 and chamber 33 of the vent valve device 3 through the brake valve. The fluid pressure acting on piston 31 is unbalanced by reason of the loss of fluid pressure in chamber 33, and the piston 32 thus moves upwardly to cut off communication from pipe 16 to brake pipe 12 and at the same time connect brake pipe 12 to the atmosphere through the large port 40 to effect reduction of fluid pressure therein at a rapid rate.

An emergency application of the automatic brakes may be further effected automatically by deenergization of the magnet valve device 4.

The magnet valve 4 is shown normally energized by a circuit from the supply battery 60 controlled by a speed responsive switch 91 and, as will be explained later, by the circuit-checking equipment constituting my invention. Deenergization of the magnet valve 4 by any cause such as loss of supply current, operation of either the speed controlled switch or the circuit-checking equipment will result in the venting of fluid pressure from chamber 33 of the vent valve device 3 and in an emergency venting of brake pipe pressure to the atmosphere.

Emergency venting of the brake pipe pressure results in brake pipe pressure being quickly reduced to atmospheric pressure. Such a reduction in fluid pressure in chamber 76 of the automatic brake control device 7 results in movement of the piston 75 to the application position and an equalization of auxiliary reservoir pressure into the brake cylinder 8, thus producing an application of the brakes with maximum force.

Figure 2:
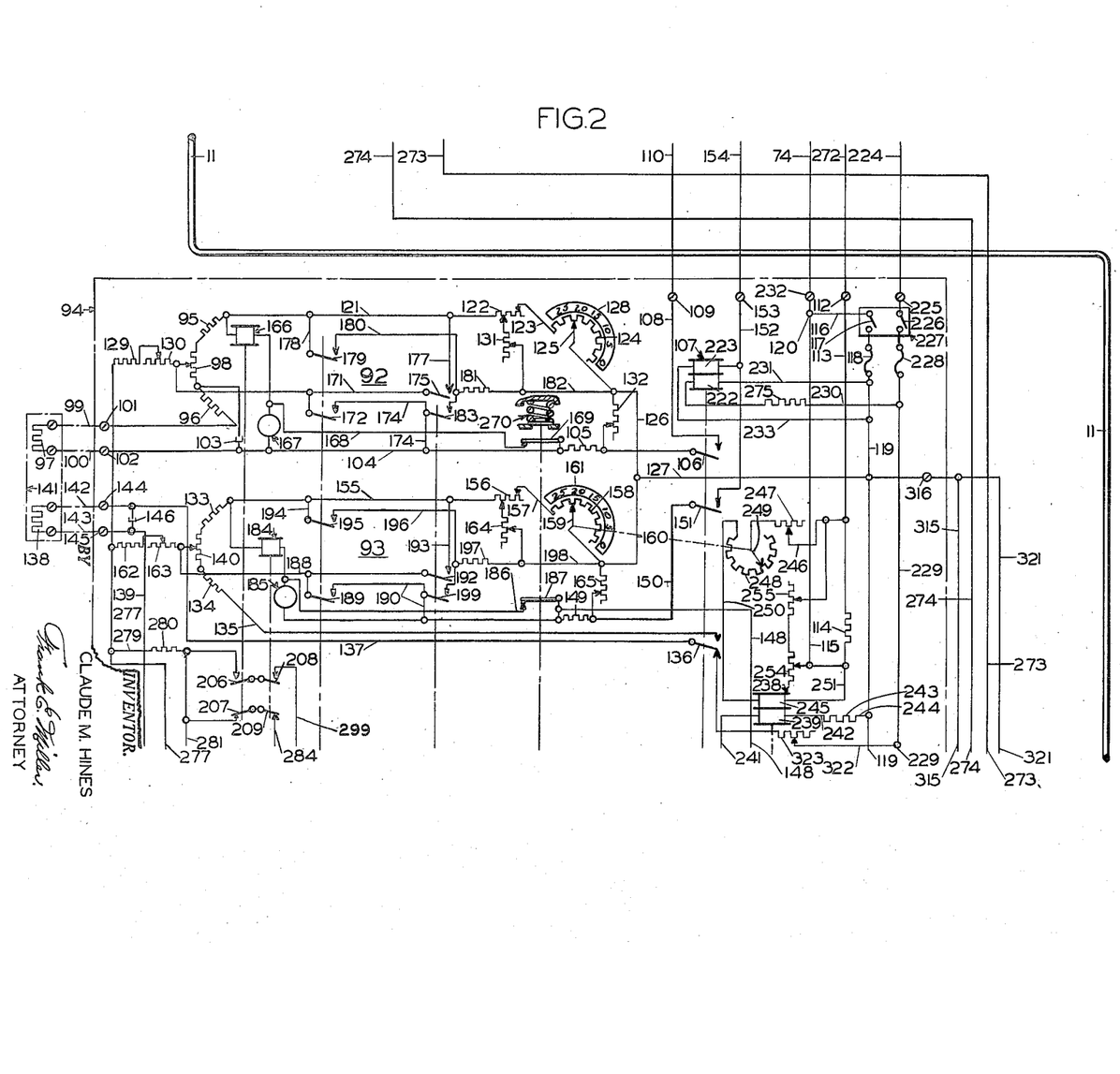
Figure 3:
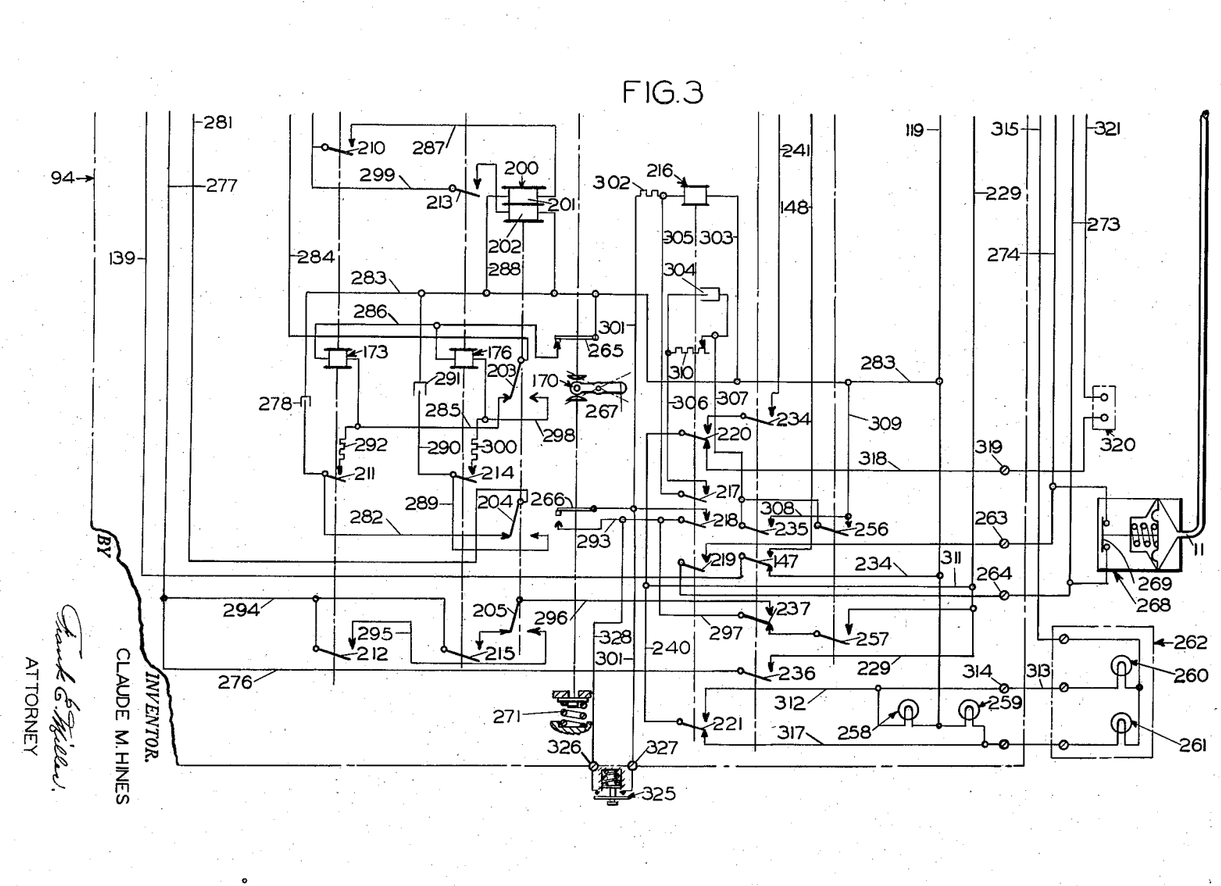

According to my invention, the circuit-checking and signalling apparatus, which I propose to use in conjunction with the above described brake control equipment to indicate the operative condition of the brake control circuits and to effect an automatic application of the brakes should the operator attempt a straight-air brake application when the electrical control circuits are faulty, is shown in Figs. 2 and 3. This circuit-checking apparatus comprises essentially a Wheatstone Bridge arrangement for each of the two brake control circuits to be checked. It will be recalled that the brake equipment just described employs two control circuits, namely (1) the release control circuit comprising the release control wire 63 and the common return or ground wire extending throughout the train with the release electro-magnet 72 on the locomotive and different cars in the train connected in parallel therebetween and (2) the application control circuit comprising the application control wire 62 and the common return or ground wire with the application electro-magnet 67 on the locomotive and each of the different cars in the train connected in parallel therebetween.

The circuit-checking equipment comprises two similar Wheatstone Bridge arrangements 92 and 93, the bridge arrangement 92 being applied to the application control circuit and the bridge arrangement 93 being applied to the release control circuit. These bridge arrangements together with the necessary cooperating relays and indicating signals are included in an equipment case 94 with the necessary lead wires, as identified hereinafter for connecting to the train wires, and to the signals, etc. Each bridge arrangement comprises the usual four branches, one of the branches including the control circuit to be checked.

Specifically, the Wheatstone Bridge arrangement 92 includes as one branch thereof a fixed resistor 95, and a second branch including in series a fixed resistor 96 and a temperature compensating resistor 97. In order to effect a balance in the bridge, the resistor 95 should be of a value equal to the sum of the values of the resistor 96 and resistor 97. A small adjustable resistor 98 is placed between these two branches to adjust for manufacturing differences of the values of resistors 95, 96 and 97 and thus keep the resistance valves of the two branches equal. The temperature compensating resistor 97 may be located remotely of the case 94 so as to be subject to the atmospheric temperature and not influenced by locomotive cab or control car temperature where the checking equipment may be located. Automatic compensation for changes in control circuit resistance due to atmospheric temperature variation is thus accomplished. The resistor 97 is connected into the bridge branch by suitable leads 99 and 100 between the resistor and suitable binding posts 101 and 102 on the equipment case 94. A condenser 103 carried within the case 94 is connected in parallel to the resistors 96 and 97 and serves to prevent any inductive effect of current variations in the bridge circuit from influencing the bridge balance condition.

Another or third branch of the bridge arrangement 92 includes the application magnet control circuit. This branch includes wire 104, a resistor 105, switch contact member 106 of a relay 107 hereinafter to be described, wire 108, binding post 109 on the case, lead 110 to the application train wire 62, then over the various application electro-magnets 67 in parallel, to the common wire 272, binding post 112 on the case 94, wire 113, resistor 114, and wire 115, to the junction 120.

The fourth branch of the bridge arrangement 92 comprises wire 121, variable resistor 122, wire 123, variable resistor or rheostat 124 having a manually operable contact arm 125, wire 126, wire 127, wire 119, fuse 118, contact member 117 and wire 116 to the junction 120. The contact arm 125 is positioned manually in correspondence with the number of cars in the train as shown on the escutcheon plate 128.

The first branch of the bridge 92, namely resistor 95, is joined to one end of resistor 98 while the second branch of the bridge arrangement is joined to the opposite end of said resistor. The fourth branch is joined to the first branch at the resistor 95 and the third branch is joined to the second branch of the bridge at the junction of condenser 103 and wire 104. The third and fourth branches are joined at the junction 120.

The variable resistor 124 in the fourth branch of the bridge is of a value equal to the resistance of the application electro-magnet 67 on the locomotive when the contact arm 125 is positioned at the extreme right-hand position in registration with the 0 position indicated on the escutcheon plate 128. With the resistance of the locomotive brake control equipment in the third branch of the bridge thus matched in the fourth branch, the resistor 124 and contact arm 125 can be calibrated such that the ostensible number of application control magnet windings in the train brake control equipment can be determined by adjusting the contact arm 125 on the resistor 124 until the bridge arrangement is in a balanced condition.

Two current limiting resistors 129 and 130 are placed in series in the voltage supply circuit for the bridge arrangement. Resistor 130 is variable and is adjusted in accordance with the voltage applied to the checking equipment in excess of the voltage for which the equipment is designed so as to protect the bridge from being subject to too high a voltage.

When the number of cars in the train is reduced to merely one or two, there is a possibility that the voltage drop across the electro-magnets on the few cars, as supplied from the checking equipment, may be sufficient to cause the magnets to operate undesirably. In order to prevent this possibility, two like variable resistors 132 and 131 are placed in parallel with the third and fourth branches respectively and adjusted to a value simulating the resistance of the application electro-magnets of a predetermined number of cars, say two, so as to cause the total application control circuit resistance, when only one or two cars are in the train, to be sufficiently low that the voltage drop across the application electro-magnets due to current supplied from the checking equipment is insufficient to cause the undesired operation of the magnets.

The bridge arrangement 93 is similar to the bridge 92, comprising the usual four branches, one of the branches including the control circuit to be checked, in this case the release control circuit. Specifically the bridge 93 includes as one branch thereof a fixed resistor 133, and a second branch including in series a fixed resistor 134, wire 135, switch contact member 136 of relay 107, wire 137, temperature compensating resistor 138, and wire 139. A small adjusting resistor 140 is placed between these two branches to adjust for manufacturing differences for a similar reason as that of resistor 98 explained previously. The temperature compensating resistor 138 serves the same purpose for bridge 93 as resistor 97 does for bridge 92. The two temperature compensating resistors 97 and 138 are mounted together in a case 141 located in such a position as to be subject to the same atmospheric conditions as the magnets on the train. The temperature compensating resistor 138 is connected into the bridge branch by suitable leads 142 and 143 between the resistor and suitable binding posts 144 and 145 on the equipment case. A condenser 146 carried within the case 94 is connected across the leads 142 and 143 to said binding posts so as to parallel the resistor 138 and serves to prevent any inductive effect of current variations in the bridge circuit from influencing the bridge balance condition.

Another or third branch of bridge arrangement 93 includes the release magnet control circuit. This branch includes switch member 147 of relay 107, wire 148, resistor 149, wire 150, switch member 151 of relay 107, wire 152, binding post 153 on the case 94, lead 154 to the release train wire, then over the various release electro-magnets 72, in parallel, to the common wire 272, binding post 112; wires 113, resistor 114, and wires 115 to the junction 120.

The fourth branch of the bridge arrangement 93 comprises wire 155, variable resistor 156, wire 157, variable resistor or rheostat 158, having a manually operable contact arm 159, wires 160, 127, 119, fuse 118, contact member 117, wire 116 to the junction 120. The contact arm 159 is positioned manually to indicate the number of cars as shown on the escutcheon plate 161.

The first branch of the bridge 93, namely resistor 133, is joined to one end of resistor 140 while the second branch is joined to the opposite end of the said resistor. The fourth branch is joined to the first branch of the bridge arrangement at the junction of resistor 133 and wire 155 and the third branch is joined to the second branch at the switch member 147 of relay 107. The third and fourth branches are joined at the junction 120.

The variable resistor 158 in the fourth branch of the bridge is of a value equal to the resistance of the release electro-magnet 72 on the locomotive when the contact arm 159 is positioned to the extreme right-hand position in registration with the O position as indicated on the escutcheon plate 161. With the resistance of the locomotive brake control equipment in the third branch of the bridge thus matched in the fourth branch, the resistor 157 and contact arm 159 can be calibrated such that the ostensible number of release control magnet windings in the train brake control equipment can be determined by adjusting the contact arm 159 on the resistor 158 until the bridge arrangement is in a balanced condition.

Two current limiting resistors 162 and 163 are placed in series in the voltage supply circuit for the bridge arrangement. Resistor 163 is variable and is adjusted in accordance with the voltage applied to the checking equipment in excess of the voltage for which the equipment is designed, so as to protect the bridge from being subject to high voltages.

For a purpose similar to that of resistors 132 and 131 in bridge arrangement 92, two like variable resistors 164 and 165 are placed in the bridge arrangement 93 in parallel with the third and fourth branches respectively, to prevent the undesired operation of the release magnets when the number of cars in the train is low say one or two. It will be apparent that by preventing such undesired operation of the application and release magnets simultaneously, the undesired application of the brakes is prevented. On bridge 92, operatively responsive to a balanced and unbalanced condition of the bridge circuits and connected in series between wires 121 and 104 is a detector relay 166 and an electric meter 167, such as an ammeter of the zero-center type. The meter 167 is normally short-circuited by a circuit including a wire 168, normally closed switch contact member 169 of a manually operable switch 170 hereinafter described, and wire 104 to remove the resistance of the meter from the relay circuit during the automatic operation of the bridge arrangement.

Further associated with the bridge 92 is a circuit which may include either wire 171, contact member 172 of a relay 173 to be described later, and wire 174 to wire 104, or an alternate circuit which includes wire 171, contact member 175 of a relay 176 to be described later, and wire 177 to wire 121. Also associated with the bridge 92 is a circuit which may include either wire 178, contact member 179 of relay 173, wire 180, resistor 181, and wire 182 to wire 126, or an alternate circuit which includes wire 174, contact member 183 of relay 176, resistor 181 and wire 182 to wire 126. These associated circuits, so-called coding circuits, are so arranged under certain conditions described later as to alternately short-circuit first the second and fourth branches of the bridge simultaneously and then the first and third branches to produce an intentional unbalanced condition thereof. It should be noted, that due to the short-circuiting of two branches simultaneously a maximum unbalance is obtained thereby obtaining a maximum sensitivity.

The associated circuits of bridge 93 are substantially identical to those of bridge 92 and it is deemed unnecessary, therefore to describe these so-called coding circuits of bridge 93 in detail as they may be understood from the previous description of the associated circuits of the bridge arrangement 92.

The reference numerals 184 to 199 inclusive, are thus applied without repetitive description to identify the associated circuits of the bridge arrangement 93, in consecutive order corresponding to the application of the numerals 166 to 183 inclusive to the associated circuits of the bridge 92 except in cases where the elements of these circuits are common to both of the bridge arrangements.

A two-winding polarized relay 200 is associated with the relays 166, 173, 176 and 184 and cooperates with these relays to produce a coded signal of a given frequency when the two control circuits being checked retain their fidelity, as will be explained later under "Operation." This relay 200 includes the windings 201 and 202 and the contact members 203, 204 and 205. Energization of winding 201 will cause the relay contact members to assume the right-hand position and energization of winding 202 will cause the contact members to assume the left-hand position. Relay 200 being of the polarized type, energization of either winding need only be momentary, the relay contact members remaining in the position to which they are actuated responsive to energization of one winding until the other winding is energized.

The relay 166 includes the contact members 206 and 207. Contact members 206 and 207 are "front" and "back" contact members, respectively. The front contact member 206 is actuated from a dropped-out or open position to a picked-up or closed position when the winding of the relay is energized, and the back contact member 207 is actuated from a dropped-out or closed position to a picked-up or open position when the winding of the relay is energized. Relay 184 is identical in construction to relay 166 and includes front contact member 208 and a back contact member 209.

The relay 173 includes the front contact members 179, 172, 195, 189, 210, 211 and 212, all of which are actuated to a closed position when the relay is energized, but are delayed in dropping out, responsive to deenergization of the winding of the relay 173, due to a delaying circuit described hereinafter. Relay 176 is identical in construction and operation to relay 173 and includes the front contact members 175, 183, 192, 199, 213, 214 and 215. A delayed dropping-out characteristic is imparted to the contact members of the relay 176 by a delay circuit similar to that provided for relay 173.

This circuit-checking equipment further includes a signal relay 216 having the front contact members 217, 218, and 219 and the "front and back" contact members 220 and 221. The term "front and back" means that the contact members have one closed position when the relay winding is de-energized and a different closed position when the relay winding is energized.

The relay 107 comprises two separate windings 222 and 223. Winding 222 is normally energized to actuate the relay to a picked-up position. Winding 222 is energized by means of circuit extending from positive battery wire 61, by way of wire 224, "B+" terminal post 225, contact member 226 which is combined with contact member 117 to comprise the manually operated double-pole-single-throw switch 227, fuse 228, wire 229, wire 230, temperature compensating resistor 275, winding 222, wire 231, wire 119, switch contact member 117, "B—", terminal post 232 and to negative battery wire 74.

The second winding 223 of the relay 107 is included in a circuit extending from the release control wire 63 by way of lead wire 154, terminal post 153, wire 152, winding 223, wire 233, wire 119, fuse 118, contact member 117, and wire 116 to terminal post 232 and thence to negative battery wire 74. The current flow through the winding 223 produces a magnetic effect in dominating opposition to that of winding 222 so as to cause the relay 107 to assume a deenergized or dropped-out position when the windings 222 and 223 are simultaneously energized. This operation occurs upon the initiation of a brake application at the instant the release contracts of the master switch 5 are closed and will be more fully explained later.

Relay 107 further includes the front contact members 106, 151, 234, 235 and 236 and the "front and back" contact members 136, 147 and 237.

Still another relay 238 is included in the checking equipment. Relay 238 comprises two separated windings 239 and 245 as well as two front contacts 256 and 257. Winding 239 is normally energized to actuate the relay to a picked-up position by means of a circuit extending from positive battery wire 61, to wire 229 as previously traced, thence by way of wire 311, wire 240, normally picked-up contact member 220 of the relay 216, normally picked-up contact member 234 of relay 107, wire 241, winding 239, wire 242, resistor 243, wire 244, wire 119, and thence to negative battery wire 74 as previously traced.

The second winding 245 of the relay 238 is energized during a brake application to actuate the relay to a picked-up position. As previously explained upon initiation of a brake application the two windings 222 and 223 of relay 107 are so energized as to cause the contact members of said relay to assume the dropped-out position. Contact member 234 being one of said contact members is therefore not picked-up as is normal, but is dropped-out, thus opening the energizing circuit previously described of the lower winding 239 of relay 238. For reasons explained hereinafter, it is desired to maintain relay 238 in a picked-up position unless a fault indication is present. This is done by use of the second winding 245 of relay 238 which is energized during a brake application in response to the voltage drop produced on a potentiometer resistor 114 connected across the terminal posts 112 and 232 to which are respectively connected the common return wire 272 and the battery return wire 74. Specifically the circuit for energizing winding 245 may be traced from wire 113 connected to one end of resistor 114, by way of wire 246 variable resistor 247, variable resistor or rheostat 248 having a movable contact arm 249 which is operated in tandem with the contact arm 159 of rheostat 158, as indicated by the broken line, wire 250, winding 245, and wire 251 to the other end of resistor 114. The voltage drop across resistor 114 may be varied to regulate the drop-out voltage of the relay 238 by adjusting two variable resistors 254 and 255 which are in parallel with resistor 114.

Relays 107, 216 and 238 through their contact members, previously mentioned, control the signal lamps 258 and 259 on the equipment case 94, together with and in parallel with signal lamps 260 and 261 on a separate panel 262 in the operator's cab. An audible signal such as a buzzer device 320 is also provided in conjunction with the signal lamps and is actuated during a fault under control of contact 220 of relay 216. The circuit for energizing buzzer 320 extends from battery supply wire 229 by way of wire 311, wire 240, contact member 220 which will be in its lower position during a fault, wire 318, terminal post 319, buzzer 320, wire 321, and terminal post 316 to battery return wire 119.

The switch 170 comprises the contact members 169, 187, 265 which are normally biased to their closed positions as by resilient spring forces in the contacts themselves or by a separate spring 270 operatively associated therewith. Switch 170 also comprises a contact member 266 normally biased to its open position by spring force inherent in the contact itself or as by a separate spring 271 associated therewith. The switch 170 has a handle 267 which is manually operative from a normal central position to a position to one side of the normal position for moving contact members 169, 187 and 265 to their open positions against the spring force and to the opposite side of the normal position for closing the contact member 266 against the spring force.

A pneumatic switch device 268 is also provided having a normally closed contact member 269 in parallel with the contact member 219 of the signal relay 216 across wires 273 and 274 which form a circuit including the magnet valve device 4 and the switch device 91. The pneumatic switch is controlled by fluid pressure in the straight-air control pipe 11 and is arranged to open the contact member 269 when the said pressure exceeds a predetermined low pressure, such as five pounds per square inch. The switch device 268 causes magnet valve device 4 to operate to effect an automatic emergency application of the brakes in the event that a control circuit fault exists at a time that a straight-air application is initiated as will be fully explained hereinafter. Supply battery voltage is provided in this circuit checking apparatus from the positive battery wire 61 by way of lead 224, terminal post 225, switch member 226, fuse 228 to wire 229. To avoid needless repetition hereinafter in tracing circuits, the wire 229 will be referred to as the "battery supply wire," and circuits traced by reference thereto.

In like manner, wire 119 being connected to the negative side of the battery 60 by wire 74, binding post 232, junction 120, wire 116, switch member 117 and fuse 118 will hereinafter be referred to as the "battery return wire" and circuits will be traced with reference thereto.

Also, wire 113 being connected to a common return wire 272 for the magnet circuits throughout the train at the binding post 112 will be referred to as the "common" wire.

*Operation*

In preparing the circuit-checking apparatus for operation, the operator first moves the switch 227 to a position where the contact members 226 and 117 are both in the closed position, thereby connecting the battery supply wire 229 and the battery return wire 119 to the battery 60 by way of circuits previously described, the bridge arrangements being correspondingly energized over circuits previously described.

A circuit is established from the battery supply wire 229 by way of wire 230, a current limiting resistor 275, winding 222, of relay 107, wire 231 to battery return wire 119, for energizing the winding 222 thereby actuating the relay 107 to a picked-up condition in which the front contact members 106, 151, 234, 235, 236 are closed and "front and back" contact members 136, 147 and 237 are in their upper closed positions. A circuit is thus established from the battery supply wire 229 by way of contact member 236, wire 276 to wire 277, thence through the resistors 162 and 163 to the resistor 140 at the junction of the first and second branches of the bridge arrangement 93 and through resistors 129 and 130 to the resistor 98 at the junction of the first and second branches of the bridge arrangement 92. Parallel circuits are now completed through the first and fourth branches of each bridge to the junction 120 by way of wire 126, wire 127, wire 119, fuse 118, switch member 117 and wire 116 on the bridge arrangement 92, and by way of wire 160, wire 127, wire 119, fuse 118, switch member 117 and wire 116 on the bridge arrangement 92, and by way of wire 160, wire 127, wire 119, fuse 118, switch member 117 and wire 116 on the bridge arrangement 93. Parallel circuits are also completed through the second and third branch of each bridge to the junction 120 by their respective circuits thereby connecting the junction between the third and fourth branches of both bridge arrangements to the negative side of the battery supply 60 by way of binding post 232 and wire 74.

The operator balances the bridge arrangements by moving the handle 267 of switch 170 into the position for opening the contact members 169, 187 and 265. The contact members 169 and 187 are effective when thus actuated to their open positions to open the circuits, previously described, for shunting the meters 167 and 185 respectively, and the meters will accordingly indicate the condition of balance of the respective bridge arrangements. The contact arms 125 and 159 are then manually adjusted on the resistors 124 and 158 until a zero reading of the meters 167 and 185 is obtained. A balanced condition of the bridge arrangements is obtained, in which condition, the variable resistor in the fourth branch of the bridge is equal to the resistance of the train brake control circuit included in the third branch of the bridge. The position of the contact arms on the variable resistors 124 and 158 should indicate on the escutcheon plate the number of magnet valve devices 6 and correspondingly the number of cars in the train attached to the locomotive. If this indication does not agree with the actual number of cars in the train, a faulty circuit condition is thus indicated. For example, if both contact arms 125 and 159 are positioned to indicate fifteen cars in the train with the meters 167 and 185 indicating zero, when in reality there are eighteen cars, an indication is given that the train line connector between cars fifteen and sixteen is separated, or that the common wire 272 is open between cars fifteen and sixteen. If one of the contact arms is positioned to indicate fifteen cars and the other contact arm is simultaneously positioned to indicate eighteen cars in the train with the meters indicating zero, the indication is that the control circuit included in the bridge arrangement giving the fifteen car indication is open between cars fifteen and sixteen.

A grounded control circuit, or a short-circuit between a control wire and the return wire causes an indication of more cars in the train than there actually is and, in certain instances, makes it impossible to balance the corresponding bridge arrangement by contact arm adjustment on its respective resistor.

Assuming that contact member 204 of relay 200 is in its left-hand position as shown on the drawing, a circuit will be completed which enables the condenser 278 to be charged. This circuit for charging condenser 278 consists of wire 277, wire 279, resistor 280, wire 281, contact member 204 in its left-hand position and wire 282 to the condenser 278, the opposite side of which is connected to the battery return wire 119 by way of wire 283.

The bridge arrangements having been balanced, the relays 166 and 184 are deenergized. A circuit is now completed for energizing the winding of relay 173 via wire 279, resistor 280, wire 281, the back contact members 207 and 209 in serial relation, wire 284, contact member 203 of relay 200 in its left-hand position, wire 285, the winding of the relay 173, wire 286, contact member 265, and wire 283 to the battery return wire 119. Relay 173 is accordingly actuated to a picked-up condition in which the front contact members 179, 172, 195, 189, 210, 211 and 212 are in closed position. The second and fourth branches of both bridge arrangements are each thereby short-circuited by the following shunting circuits. The fourth branch of bridge 92 is shunted by way of wire 178, closed contact member 179, wire 180, resistor 181 and wire 182. The second branch of bridge 92 is shunted by way of wire 171, closed contact member 172 and wire 174. The fourth branch of bridge 93 is shunted by way of wire 194, closed contact member 195, wire 196, resistor 197 and wire 198. The second branch of bridge 93 is shunted by way of wire 188, closed contact member 189, wire 190.

It can be seen that when the second and fourth branches of the bridge arrangement 92 are simultaneously short-circuited, the first and third branches are connected in parallel with each other, and the winding of relay 166 is subjected to the voltage drop across the first and third branches, thus causing the relay 166 to be actuated to a picked-up position. The relay 184 of bridge arrangement 93 is simultaneously actuated to a picked-up position by a similar circuit. With relays 166 and 184 simultaneously energized to their picked-up positions, the back contact members 207 and 209 are actuated to their respective open positions and the front contact members 206 and 208 are actuated to their respective closed positions.

The back contact members 207 and 209 are effective in their open positions to interrupt the circuit previously traced for energizing the winding of the relay 173 and the front contact members 206, 208, 210 are effective when in closed position to establish a circuit consisting of wires 287 and 288 to wire 283 and thence to the battery return wire 119 for energizing the upper winding 201 of the relay 200 to effect movement of the relay contact members 203, 204 and 205 from their left-hand position as seen in the drawing, to their right-hand position. The contacts of relay 173 are not restored to their respective dropped-out positions responsive to interruption of the energizing circuit for the winding of relay 173 by the opening of contact members 207 and 209 as previously described, due to the fact that the condenser 278 discharges through a local loop circuit including the winding of relay 173 and a resistor 292 to thereby maintain the winding of relay 173 energized and the contact members of the relay 173 in the picked-up position for a certain length of time sufficient to permit actuating of the contact members of relay 200 fully to their right-hand positions.

Movement of the contact member 204 of relay 200 from the left-hand position to the right-hand position first opens the circuit previously described for charging the condenser 278 and then closes a circuit for charging condenser 291 associated with relay 176, such circuit extending from the battery supply wire 229, by way of switch contact member 236, wire 276, wire 277, wire 279, resistor 280, wire 281, contact member 204, wire 289, wire 290, condenser 291 and wire 283 to the battery return wire 119.

During the period of time in which the contact member 212 of the relay 173 is maintained picked-up by current discharged from the condenser 278, the contact member 205 of relay 200 in its right-hand position thereby establishes a connection to wire 293 from battery supply wire 229 by way of relay contact 236, wire 276, wire 294, contact member 212 of relay 173, wire 295, contact member 205 of relay 200, wire 296, closed contact 237 of relay 107 and wire 297 to wire 293 which leads to the contact members 266 and 218. The purpose of this connection to wire 293 as just described will be made apparent presently.

After the condenser 278 is discharged and no longer maintains the relay 173 in a picked-up position, the relay is restored to the dropped-out position opening the front contact members 179, 172, 195, 189, 210, 211 and 212. Contact member 212 thus acts to interrupt the circuit connection to wire 293 from battery supply wire 229. With the contact members 179, 172, 195 and 189 open, the circuits for short-circuiting the second and fourth branches of each of the bridges 92 and 93 are open and the bridges are returned to their normal condition. If the resistance of train circuits remains unchanged, as it will if no circuit fault exists, the bridges will remain balanced and the detector relays 166 and 184 will become deenergized, thus opening the front contact members 206 and 208 and closing the back contact members 207 and 209.

The back contact members 207 and 209 are effective in their closed positions to complete a circuit from the supply wire 277 over wire 279, resistor 280, wire 281, contact members 207 and 209, wire 284, and contact member 203 of relay 200 in its right-hand position, wire 298, the winding of relay 176, wire 286, contact member 265 of switch 170, and wire 283 to the battery return wire 119. The relay 176 is thus energized and actuated to its picked-up position in which the contact members 175, 183, 192, 199, 213, 214 and 215 are in their closed positions. The contact members 175, 183, 192 and 199 are effective in their closed positions to short-circuit the first and third branches of both bridge arrangements. The first branch of the bridge 92 is short-circuited by way of wire 171, contact member 175 and wire 177 to wire 121. The third branch of bridge 92 is short-circuited by way of wire 174, contact member 183, resistor 181 and wire 182. The first branch of bridge 93 is short-circuited by way of wire 188, contact member 192 and wire 193 to wire 155. The third branch of bridge 93 is short-circuited by way of wire 190, contact member 199, resistor 197 and wire 198.

It can be seen that when the first and third branches of the bridge arrangement 92 are simultaneously short-circuited, the second and fourth branches are connected in parallel with each other, and the winding of relay 166 is subjected to the voltage drop across the second and fourth branches thus causing the relay 166 to be energized and actuated to a picked-up condition. The relay 184 of the bridge arrangement 93 is simultaneously energized and actuated to a picked-up condition by a similar circuit. With relays 166 and 184 simultaneously energized and actuated to a picked-up condition, the front contact members 206 and 208 are actuated to their respective closed positions and the back contact members 207 and 209 are actuated to their respective open positions.

The actuation of contact member 213 of relay 176 to its closed position incidental to the pick-up of relay 176, prepares a circuit which is completed by the closing of contact members 206 and 208. Such circuit extends from the wire 279, by way of resistor 280, closed contact members 206 and 208, wire 299, contact member 213, the lower winding 202 of relay 200, and wire 283 to the battery return wire 119. Relay 200 is thus actuated to effect movement of the contact members 203, 204 and 205 to their respective left-hand positions, from their right-hand positions.

Contact member 205 is effective in its left-hand position to establish a circuit from the battery supply wire 229 by way of relay contact 236, wires 276 and 294, closed contact member 215 of relay 176, the contact member 205 in its left-hand position, wire 296, contact member 237, and wire 297 to wire 293. The purpose of this connection will be made apparent presently.

The shift of the contact member 204 from its right-hand to its left-hand position interrupts the circuit previously traced for charging the condenser 291 and establishes the circuit previously traced for charging condenser 278.

The interruption of the circuit for energizing the winding of relay 176 due to opening of contact members 207 and 209 is not effective to cause immediate drop-out of the contacts of relay 176 because the dropping out of relay 176 is delayed for a predetermined period of time by the discharging of condenser 291 through a local loop circuit including resistor 300 and the winding of relay 176. As soon as the condenser 291 is discharged, the relay 176 is deenergized or dropped-out, thus opening contact members 175, 183, 192, 199, 213, 214 and 215. The dropping-out of contact members 175, 183, 192 and 199 opens the short-circuit paths previously described for both bridge arrangements, thus restoring the bridge arrangements to normal. If the bridge arrangements are restored to balanced condition, as they will be if no fault exists on the train circuits, the relays 166 and 184 becomes deenergized and are restored to their dropped-out position, thus initiating another cycle of operation as previously described.

From the above description it can be seen that the above described cycling operation of the relays 166 and 184, 173, 176 and 200 will continue so long as the bridge circuits are restored to balanced condition between successive intentional short-circuitings of the branches of the bridge arrangements. Thus it will be understood that contact member 205 of relay 200 is oscillated between its right-hand and left-hand positions at a frequency corresponding to the frequency of operation of relays 173 and 176. For example, the frequency of operation of relays 173 and 176 may be such that contact member 205 of relay 200 will have a frequency of vibration of approximately 30 vibrations per minute, thus connecting wire 293 to battery supply wire 229 at intervals of two seconds.

With the equipment operating as just described, movement of the control lever 267 of the switch 170 by the operator to a position for closing the contact member 266 results in further operation now to be described. With the contact member 266 closed, an impulse of current will be supplied from wire 293 when connected to battery supply wire 229, at the times previously described, to the winding of relay 216 over a circuit extending by way of switch contact 266, wire 301, current limiting resistor 302, the winding of relay 216, wire 303 to wire 283 which is connected to the battery return wire 119, thereby energizing the relay 216 and effecting a movement of the contact members 220, 217, 218, 219, 221 to their upper closed positions. With contact member 217 thus closed, the impulse of current energizing relay 216 is also supplied to the condenser 304 for charging of same by a circuit including wire 305, contact member 217, wire 306, condenser 304, wire 307, contact member 235 of relay 107, wire 308, wire 309 and wire 283 to the battery return wire 119. A variable resistor 310 is provided in parallel with condenser 304 to regulate the discharge of the condenser to a predetermined rate. With the condenser 304 charged to battery voltage, it will by reason of the closed circuit from said condenser, wire 306, closed contact member 217, wire 305, the winding of relay 216, wire 303, and wire 283, hold the relay 216 energized for slightly more than a two-second period until another impulse of current is provided over the wire 293.

With the relay 216 energized and the front contact member 218 closed, it will no longer be necessary for the operator to hold contact member 266 of switch 170 in closed position. Any impulse of current provided on wire 238 will now be supplied by way of contact member 218 of relay 216, wire 301, and resistor 302 for energizing the winding of relay 216 and recharging the condenser 304. It can thus be seen that so long as the impulses are supplied to the wire 293 at the prescribed interval of time before the condenser 304 becomes discharged, the relay 216 will be maintained energized and consequently picked-up.

While the relay 216 is maintained picked-up, a circuit for energizing the signal lamp 258 is completed from the battery supply wire 229 over wire 311, wire 240, contact member 221 of relay 216 in its upper closed position, wire 312 and the signal lamp 258 to the battery return wire 119. In parallel with the signal lamp 258 is the signal lamp 260 on the indicating panel 262 in the cab, with a lead wire 313 connected to a terminal 314 which is connected to battery supply by wire 312 as just described, and another lead wire 315 connected to terminal 316 which is connected to the battery return wire 119. The signal lamps 258 and 260 remain energized to indicate to the operator the integrity condition of the circuits and are deenergized upon the occurrence of a fault in the brake control circuits as presently described.

Should a change is resistance of either or all control circuits arise, such changes being caused by failure of magnet windings, couplers, wires, by loss or addition of cars, short or grounded circuits, etc., the bridge arrangements will not balance when the short circuits of the bridge branches are removed. In such a case, the detector relay 166 or 184 in the respective bridge arrangement will not drop out. The circuit over contact members 207, 209, wire 204, contact member 203 to energize the selected relay 173 or 176 is thus not restored. The coding operation of relays 166, 184, 173, 176 and 200 is thereby interrupted and the repeated current impulses, supplied to energize the winding of relay 216, fail to continue, with the result that the relay 216 is restored to its dropped-out position. With relay 216 thus dropped-out, the back contact members 220 and 221 are closed in the down position, and the front contact members of said relay are opened in the down position. The contact member 221, being in the down closed position, is effective to complete a circuit from the supply wire 229 by way of wire 311, wire 240, contact member 221, wire 317, danger signal lamp 259 to the battery return wire 119, for energizing the danger signal lamp 259. A similar danger signal lamp 261 on the indicating panel 262 is connected in parallel with the signal lamp 259 and therefore will be energized simultaneously with the signal lamp 259. It is seen that at the same time the danger signal lamps 259 and 261 are energized, the clear signals 258 and 260 will be deenergized by the moving of the contact member 221 from the upper closed position to the down closed position. At the same time, battery voltage is supplied over wire 311, wire 240 to the down closed contact member 220, wire 318, and terminal 319 to buzzer 320 or similar audible warning device and thence to the terminal 316 and the battery return wire 119.

In the event that a fault on the control circuit is indicated, the operator may proceed to determine the location of the fault by operation of switch handle 267 of switch 170 to its position in which, the normally closed contact members 169, 187 and 265 are in open position.

Contact members 169 and 187 are effective in their open positions to cut in meters 167 and 185 respectively, into operation. At the same time contact member 265 interrupts the connection from relays 173 and 176 to battery return wire 119, thereby stopping operation of these relays.

Adjustment of contactor arms 125 and 159 may thus be effected, as previously described, to determine the location of the fault.

If during the time the signal lamps 258 and 260 are energized, the operator initiates a straight-air brake application, the release wire 63 will first be energized, as previously explained, and a circuit will be established for energizing the top winding 223 of relay 107, which circuit extends from release wire 63 by way of lead 154, wire 152, the winding 223 of relay 107, and wire 233 to the battery return wire 119. This energization of top winding 223 opposes the energization of the bottom winding 222 which is effected by a circuit extending from the battery supply wire 229 by way of wire 230, a voltage limiting resistor 275 which prevents the winding 222 from overheating, winding 222, and wire 231 to battery return wire 119. The opposing energization of the two windings will effect movement of the relay 107 to the dropped-out position, in which the front contact members 106, 151, 235 and 236 are opened and the front and back contact members 136, 147 and 237 are shifted to their lower closed position.

When the front contact member 236 is actuated to its open position, the circuits previously explained for energizing the bridge arrangements 92 and 93 and the relays 173 and 176 from the battery supply wire 229 are interrupted thereby discontinuing the previously described cycling operation. The contact members 106 and 151 are actuated to their respective open positions during a straight-air brake application for the purpose of preventing any flow of current from the application train wire 62 and the release train wire 63 respectively, to the bridge arrangements 92 and 93 which would prevent the normal operation of the application and release magnet valve devices 67 and 72. This precaution is taken since any current flow in the third branches of the bridge arrangements may prove harmful to the bridge arrangements by grounding out through the resistors 132 and 165 to wire 121 and thence to the battery return wire.

The back contact member 237 closes a circuit from the battery supply wire 229 by way of contact member 257 of relay 238 which is energized and thereby actuated to its picked-up position, as explained hereinafter, and back contact member 237 of relay 107, wire 297, closed contact member 218, wire 301, resistor 302, the winding of relay 216, wire 303 and wire 283 to the battery return wire 119 for maintaining the relay 216 energized. Also, a circuit is completed from the battery supply wire 229 through wire 322, resistor 323, back contact member 136 of relay 107 in its down closed position, wire 137, binding post 144, lead 142, resistor 138, lead 143, binding post 145, wire 139, back contact member 147 in its down closed position, and wire 234 to the battery return wire 119, for the purpose of keeping the temperature compensating resistor 138 heated to compensate for the heating of and the consequent change in resistance of the release control circuits in the train on the third branch of the bridge arrangements 93 which are constantly energized under the control of master switch device 5 during a straight-air brake application.

Also when there is a straight-air brake application the common wire 272 will be energized and the voltage drop across the resistor 114 will be sufficient to maintain winding 245 of relay 238 energized and keep the contact members 256 and 257 in a closed position. The contact arm 249 of resistor 248 is positioned in correspondence with the contact arm 159 of resistor 158, as by connection through a common shaft, indicated by the broken line in Fig. 2 of the drawing for the purpose of varying the resistance in series with winding 245 of relay 238 according to the actual number of cars in the train. The resistance of that portion of resistor 248 included in series with winding 245 of relay 238 and subject to the voltage drop across resistor 114 is thus automatically adjusted so that the current energizing the winding 245 while only the release control circuit is energized, is slightly in excess of that required to maintain the relay in its picked-up position, for any given number of cars in the train, provided no fault exists on the release control circuit. The voltage drop across resistor 114, occurring when both the application and the release control circuits are energized, is greater than that existing when only the release control circuit is energized, and thus deenergization of the application control circuit, with no fault existing on the release control circuit, does not result in a drop-out of the relay 238. Similarly the occurrence of such a fault on only the application control circuit, during a brake application, as causes either an increase or a reduction of current in the return wire 272 will not effect a drop-out of relay 238. It will thus be seen that during a brake application, relay 238 will be restored automatically to its dropped-out position as a result of only such faults as occur on the release control circuit and causing a reduction of the current in return wire 272 and a corresponding reduction in the voltage drop across resistor 114 below that required to energize the winding 245 of relay 238 sufficiently to maintain the relay in a picked-up position.

Contact member 257 of relay 238 is effective, when thus restored to its dropped-out or open position, to break the circuit described in a previous paragraph for energizing relay 216 and holding contact members 221 and 220 of relay 216 in a picked-up closed position. Contact members 221 and 220 consequently move to the down closed position, thereby establishing the circuits for energizing the warning signal lamps 259 and 261 and the warning buzzer 320 by the circuits previously described.

The contact member 256 of relay 238 is effective when restored to its dropped-out or open position to open the local loop circuit for discharging condenser 304 so that the condenser 304 will be unable to discharge through the winding of relay 216, thus causing an instantaneous dropping-out of relay 216 when a fault occurs during a brake application.

The front contact member 219 of relay 216 is closed except during a fault indication when the relay 216 is dropped out or deenergized. The contact member 219 is included in parallel with the contact member 269 of the pneumatic switch 268 in a circuit for energizing the winding 43 of magnet valve device 4 which circuit extends from the positive terminal of the battery supply 60 to the speed responsive switch 91, wire 274, terminal post 263, contact member 219, terminal post 264, wire 273, the winding 43 of the magnet valve device 4 and thence to the wire 74 which is connected to the negative terminal of the battery supply 60. The speed-responsive switch 91 is controlled and operated by means not shown and not part of this invention, so as to automatically interrupt this just described circuit at a selected high speed of the train and thus cause an automatic application of the train brakes in a manner presently described. The contact member 269 of switch device 268 is actuated to its open position when a predetermined fluid pressure, such as 10 pounds per square inch, is established in the straight-air control pipe 11. Thus, while a fault indication is given by the circuit checking apparatus and the contact member 219 is in its open position, if the operator attempts to make a straight air brake application, the actuation of contact member 269 of switch 268 to its open position, opens the circuit energizing the winding of magnet valve device 4. The chamber 33 of the vent valve device 3 is thereby vented and, as previously described, an automatic brake application is effected by the venting of fluid pressure from the brake pipe by operation of the vent valve device.

If so desired, the switch device 268 may be disconnected from its circuit or omitted. In such case, the energizing circuit for the magnet valve device 4 is opened immediately upon the restoration of contact member 219 to open position upon a fault indication, thus causing an automatic brake application at the time the fault occurs without waiting until a straight-air brake application is initiated.

Normally, an intermittent fault which lasts for a sufficient length of time to cause deenergization of relay 216 will result in continued deenergization of this relay unless the winding of relay 216 is restored by manual operation of switch 170. Similarly, a fault which is self-correcting after a short interval of time sufficient to cause deenergization of relay 216 would normally result in continued deenergization of this relay unless restored by manual operation of switch 170. If such faults exist, it might prove very inconvenient to the operator to repeatedly operate the switch 170 to restore the relay 216 to its energized condition especially if the equipment case 94 and thus the switch 170 were located in a position remote to the operator's station in the locomotive. To provide for such instances, the two terminal posts 326 and 327 on the equipment case 94 are connected to opposite terminals of the switch including the contact member 266 of the switch device 170 and to opposite terminals of the switch including contact member 218 of relay 216 by wires 328 and 301, respectively. A push-button type switch 325 may be connected to these terminal posts 326 and 327 and located at any place convenient to the operator and thus provide for a more convenient manual restoration of the energization of the relay 216 in case of such intermittent faults, by a manner presently described. After the fault is corrected, if it is a self-correcting fault, or during the interval when the train control circuits are unimpaired if the fault is intermittent, the switch 325 is operated so as to connect the two terminals 326 and 327 together to complete a circuit from wire 293 which is connected to battery supply as previously described, to wire 328, switch 325, wire 301, resistor 302, the winding of relay 216, wire 303, and wire 283 to the battery return wire 119 which will energize and restore relay 216 to its picked-up position, in which position the fault indication circuits are deenergized and the clear indication signal lamps 258 and 261 are energized by circuits previously described. An alternate means for effecting a completion of the above described circuit is to substitute for the push-button switch 325, a jumper wire (not shown) extending from the terminal post 326 to the terminal post 327. By allowing a jumper wire to continuously connect the terminal post 326 to the terminal post 327 it is apparent that if such an intermittent or self-correcting fault would occur, the relay 216 would be restored to its picked-up position automatically when the fault is corrected and the relays 173 and 176 are operating normally.

It should be understood that while my invention has been disclosed specifically in connection with two control circuits it is not limited in its operation to any particular number of control circuits. It may be adapted by the addition or subtraction of bridge arrangements and detector relays to operate with any number of control circuits to control the coding relays.

Having now described my invention, what I claim as new and desire to secure by Letters Patent, is:

1. For use in connection with a vehicle brake control circuit, apparatus for signaling the integrity of the brake control circuit, said apparatus comprising a first means responsive to the integrity of the brake control circuit while the brakes controlled thereby are released, a second means responsive to the integrity of the brake control circuit while the brakes controlled by the brake control circuit thereby are applied, and means controlled automatically by said first or said second means depending upon whether the brakes are released or applied for indicating the integrity of the brake control circuit.

2. For use in connection with a vehicle brake control circuit, apparatus for signaling the integrity or lack of integrity of the brake control circuit, said apparatus comprising a first means responsive to the integrity or lack of integrity of the brake control circuit while the brakes controlled thereby are released, a second means responsive to the integrity or lack of integrity of the brake control circuit while the brakes controlled by the brake circuit are applied, and means controlled automatically by said first or said second means depending upon whether the brakes are released or applied for indicating the integrity or lack of integrity of the brake control circuit.

3. For use in connection with a plurality of brake control circuits cooperatively functioning to control the application and release of the brakes on a vehicle, apparatus for signaling the integrity or lack of integrity of the brake control circuits said apparatus comprising a first means responsive to the integrity or lack of integrity of all of said brake control circuits while the brakes controlled thereby are released, an electro-responsive means responsive to the integrity or lack of integrity of only one of said brake control circuits while the brakes controlled by said brake control circuits are applied, and means controlled automatically by said first means or by said electro-responsive means, depending upon whether the brakes are released or applied, for indicating the integrity or lack of integrity of the brake control circuits or of said one brake control circuit.

4. For use in connection with a plurality of brake control circuits cooperatively functioning to control the application and release of the brakes on a vehicle, apparatus for signaling the integrity of the brake control circuits, said apparatus comprising a Wheatstone Bridge arrangement for each control circuit, each bridge arrangement including a corresponding control circuit as a branch thereof, a branch including a variable resistor unit adjustable to conform to the resistance of the corresponding control circuit to produce a balanced condition of that bridge arrangement when the brakes subject to the control of that brake control circuit are released, electrical means responsive to the balanced condition of the bridge arrangement for each control circuit to effect an intentional unbalanced condition thereof and responsive to the intentional unbalanced condition of the bridge arrangement to restore the balanced condition thereof as long as no fault occurs on said brake control circuit while the brakes controlled thereby are released; additional means responsive to the integrity of one of the brake control circuits while the brakes subject to the control of the brake control circuits are applied; and means selectively controlled automatically by the electrical means of said Wheatstone Bridge arrangements or by said additional means, depending upon whether the brakes are released or applied, for indicating the integrity of the said brake control circuits or of said one brake control circuit.

5. For use in connection with a vehicle brake control circuit, apparatus for signaling the integrity or lack of integrity of the brake control circuit, said apparatus comprising a first means responsive to the integrity or lack of integrity of the brake control circuit while the brakes controlled thereby are released, an electro-responsive device effective when energized by current exceeding a certain value to have one position and when energized by a current below said certain value to have a different position, means associating said electro-responsive device with the said control circuit in such a manner as to cause said electro-responsive device to be energized when the brakes controlled by said circuit are applied, by a current exceeding said certain value as long as the integrity of the control circuit is not impaired and for causing said electro-responsive device to be energized by a current below said certain value when the integrity of the control circuit is impaired; and means controlled automatically by said first means or by said electro-responsive device depending upon whether the brakes are released or applied, for indicating the integrity or lack of integrity of the brake control circuit.

6. For use in connection with a brake control circuit for a train of cars, apparatus for signaling the integrity or lack of integrity of the brake control circuit, said apparatus comprising a first means responsive to the integrity or lack of integrity of the brake control circuit while the brakes controlled thereby are released, an electro-responsive device effective when energized by current exceeding a certain value to have one position, and when energized by a current below said certain value to have a different position, means associating said electro-responsive device by a current exceeding said certain value as long as the integrity of the control circuit is not impaired and for causing said electro-responsive device to be energized by a current below said certain value when the integrity of the control circuit is impaired, a variable resistor unit pre-adjustable according to the number of cars in the train, to conform to the normal resistance of the brake control circuit existing when the brakes controlled thereby are applied, to adjust the current delivered to said electro-responsive device to a said certain value for operating said electro-responsive device as indicated in last said means; and means controlled automatically by said first means or said electro-responsive device, depending upon whether the brakes are released or applied, for indicating the integrity or lack of integrity of the brake control circuit.

7. For use in connection with a plurality of brake control circuits cooperatively functioning to control the application and release of the brakes on a vehicle, apparatus for signaling the integrity and lack of integrity of the brake control circuits, said apparatus comprising a Wheatstone Bridge arrangement for each control circuit, each bridge arrangement including a corresponding control circuit as a branch thereof, a branch including a variable resistor unit adjustable to conform to the resistance of the corresponding control circuit to produce a balanced condition of that bridge arrangement when the brakes subject to the control of the brake control circuits are released, electrical means responsive to the balanced condition of the bridge arrangement for each control circuit to effect an intentional unbalanced condition thereof and responsive to the intentional unbalanced condition of the bridge arrangement to restore the balanced condition thereof as long as no fault occurs on said brake control circuit while the brakes controlled thereby are released; a relay means having a winding effective when energized by current exceeding a certain value to maintain the relay means in one position and when the current reduces below said certain value to cause operation of the relay means to a different position, means for causing the winding of said relay to be energized by a current exceeding said certain value as long as the integrity of one of the said control circuits is not impaired and for causing a reduction of the current energizing the said winding to below said certain value when the integrity of the said one control circuit is impaired, and means controlled automatically by the electrical means of said Wheatstone Bridge arrangements or by said relay means, depending upon whether the brakes are released or applied, for indicating the integrity or lack of integrity of the brake control circuits or of said one circuit.

8. For use in connection with a plurality of brake control circuits cooperatively functioning to control the application and release of the brakes on a train of cars, apparatus for signaling the integrity or lack of integrity of the brake control circuits, said apparatus comprising a Wheatstone Bridge arrangement for each control circuit including a corresponding control circuit as a branch thereof, a branch including a variable resistor unit adjustable to conform to the resistance of the corresponding control circuit to produce a balanced condition of that bridge arrangement when the brakes subject to the control of that brake control circuit are released, electrical means responsive to the balanced condition of the bridge arrangement for each control circuit to effect an intentional unbalanced condition thereof and responsive to the intentional unbalanced condition of the bridge arrangement to restore the balanced condition thereof as long as no fault on said brake control circuit occurs while the brakes controlled thereby are released; an electro-responsive device effective when energized by current exceeding a certain value to have one position, and when energized by a current below said certain value to have a different position; means for causing the electro-responsive device to be energized by a current exceeding said certain value as long as the integrity of one of said control circuits is not impaired and for causing a reduction of the current energizing the said electro-responsive device to below said certain value when the integrity of the said one control circuit is impaired; a resistance variable according to the number of cars in the train to so conform to the normal resistance of the brake control circuit existing when the brakes controlled thereby are applied, as to provide substantially the same current for energizing said electro-responsive device under no fault and fault conditions respectively, notwithstanding variation in the number of cars in the train and means controlled automatically by the electrical means of said Wheatstone Bridge arrangement or by said electro-responsive device, depending upon whether the brakes are released or applied, for indicating the integrity or lack of integrity of the brake control circuits or of said one control circuit.

9. For use in connection with a brake control circuit operatively controlling the application and release of the brakes on a train of cars having a brake system which includes an application control circuit and a release control circuit, apparatus comprising a Wheatstone Bridge arrangement adapted to receive the application control circuit as a branch thereof, and a second Wheatstone Bridge arrangement adapted to receive the release control circuit as a branch thereof, each bridge arrangement further including as a second branch thereof a resistor unit adjustable to conform to the resistance of the corresponding control circuit to produce a balanced condition of that bridge arrangement while the brakes controlled by the brake control circuits are released, a third and a fourth branch each including a fixed resistor, electrical means responsive to the balanced condition of the bridge arrangement for each control circuit to effect an intentional unbalanced condition thereof, and responsive to the intentional unbalanced condition of the bridge arrangements to restore the balanced condition thereof as long as no fault occurs on said brake control circuits while the brakes controlled thereby are released, a temperature compensating resistor in said fourth branch of each bridge arrangement subject to atmospheric temperature and having an electrical characteristic such that it compensates for changes in the corresponding control circuit resistance, due to atmospheric temperature changes, in a manner to prevent undesired unbalance of the bridge arrangements, means for deenergizing both of said bridge arrangements while the brakes subject to the control of the said control circuits are applied, means for separately energizing the temperature compensating resistor for said second Wheatstone Bridge arrangement, when the brakes controlled by the brake control circuits are applied, to cause heating thereof in correspondence with the heating of the release control circuit when the brakes are applied, in a manner to prevent undesired unbalance of that bridge arrangement when the brakes controlled by the brake control circuit are released after an application, and means controlled automatically by said electrical means of said first and second Wheatstone Bridge arrangements when the brakes are released for indicating the integrity of the brake control circuits.

10. For use in connection with a brake control circuit operatively controlling the application and release of the brakes on a train of cars having a braking system which includes an application control circuit and a release control circuit, apparatus comprising a Wheatstone Bridge arrangement adapted to receive the application control circuit as a branch thereof and a second Wheatstone Bridge arrangement adapted to receive the release control circuit as a branch thereof, each bridge arrangement further including as a second branch thereof a resistor unit adjustable to conform to the resistance of the corresponding control circuit to produce a balanced condition of that bridge arrangement while the brakes controlled by the brake control circuits are released, a third branch and a fourth branch each including a fixed resistor, electrical means responsive to the balanced condition of the bridge arrangement for each control circuit to effect an intentional unbalanced condition thereof and responsive to the unbalanced condition of the bridge arrangement to restore the balanced condition thereof as long as no fault occurs on said brake control circuits while the brakes controlled thereby are released, a temperature compensating resistor in said fourth branch of each bridge arrangement subject to atmospheric temperature and having an electrical characteristic such that it compensates for changes in the corresponding control circuit resistance, due to atmospheric temperature changes, in a manner to prevent undesired unbalance of the bridge arrangement, means for deenergizing both of said bridge arrangements while the brakes subject to the control of the said control circuits are applied, means for separately energizing the temperature compensating resistor for said second Wheatstone Bridge arrangement, when the brakes controlled by the brake control circuits are applied, to cause heating thereof in correspondence with the heating of the release control circuit when the brakes are applied, in a manner to prevent undesired unbalance of that bridge arrangement when the brakes controlled by the brake control circuit are released after an application, electro-responsive means responsive to the integrity of one of said brake control circuits while the brakes controlled by the brake control circuits are applied, and means controlled automatically by either said electrical means of said first and second Wheatstone Bridge arrangements, or by said electro-responsive means depending upon whether the brakes are released or applied, for indicating the integrity of the brake control circuits or of said one brake control circuit.

11. For use in connection with a plurality of vehicle brake control circuits, the combination of a first means responsive to the integrity of the brake control circuits while the brakes controlled thereby are released, a second means responsive to the integrity of one of said brake control circuits while the brakes controlled thereby are applied, means responsive to energization of said one brake control circuit incidental to initiation of a brake application for automatically rendering said first means ineffective and said second means effective, and responsive to the deenergization of said one brake control circuit incidental to a brake release for automatically rendering said first means effective and said second means ineffective, and means controlled automatically by said first or said second means, depending upon whether the brakes are released or applied, for indicating the integrity of the brake control circuits or of said one control circuit.

12. For use in connection with a plurality of vehicle brake control circuits, the combination of a first means responsive to the integrity of the brake control circuits while the brakes controlled thereby are released, a second means responsive to the integrity of one of said brake control circuits while the brakes controlled thereby are applied, means responsive to the energization of said one brake control circuit, incidental to initiation of brake application, for automatically rendering said first means ineffective and said second means effective, and responsive to the deenergization of said one brake control circuit incidental to a brake release for automatically rendering said first means effective and said second means ineffective, and a single means controlled automatically by either said first or said second means, depending upon whether the brakes are released or applied, for indicating the integrity of the brake control circuits or of said one control circuit.

13. For use in connection with vehicle brake control circuits, the combination of a first means responsive to the integrity or lack of integrity of the brake control circuits while the brakes controlled thereby are released, a relay having two separately energizable windings, one of said windings being effective when energized to cause pick-up of said relay and to maintain said relay picked-up, and the other of said windings being effective only when energized by a current exceeding a certain value, for maintaining the said relay pick-up, means for energizing said one winding only while the brakes controlled by the brake control circuits are released, means for energizing the other of said windings by a current exceeding said certain value only when the brakes controlled by said brake control circuits are applied and the integrity of one of said control circuits is not impaired, and signal means controlled alternatively by said first means or by said relay, depending upon whether the brakes are released or applied, for indicating the integrity or lack of integrity of the brake control circuits or of said one control circuit.

14. For use in connection with vehicle brake control circuits on a train of cars, the combination of a first means responsive to the integrity or lack of integrity of the brake control circuits while the brakes controlled thereby are released, a relay having two separately energizable windings, one of said windings being effective when energized to cause pick-up of said relay and to maintain said relay picked-up, and the other of said windings being effective only when energized by a current exceeding a certain value for maintaining the said relay picked-up, means for energizing said one winding only while the brakes controlled by the brake control circuits are released, means for energizing the said other winding in accordance with the current in one of said brake control circuits and by a current exceeding said certain value only when the brakes controlled by said brake control circuits are applied and the integrity of said one brake control circuit is unimpaired, variable resistance means preadjustable according to the number of cars in the train to adjust the current in the said other winding to a value in excess of said certain value, notwithstanding variation in the number of cars in the train, as long as the integrity of the said one brake control circuit is not impaired, and a signal means controlled alternatively by said first means or by said relay, depending upon whether the brakes are released or applied, for indicating the integrity or lack of integrity of the brake control circuits or of said one control circuit.

15. For use in connection with an electric circuit, the combination of a relay having two separate windings, one of said windings being effective when energized to cause pick-up of said relay and to maintain said relay picked-up, and the other winding being effective only when energized by a current exceeding a certain value for maintaining the said relay picked-up, means for energizing said one winding and deenergizing said other winding when said circuit is deenergized and for deenergizing said one winding and energizing said other winding when said circuit is energized, variable resistor means preadjustable to adjust the current in the said other winding to a value in excess of said certain value, notwithstanding variation in the resistance of the control circuit, as long as the integrity of the said control circuit is not impaired, and signal means controlled by said relay for indicating the integrity or lack of integrity of the said circuit while it is energized.

16. For use in connection with a plurality of brake control circuits cooperatively functioning to control the application and release of the brakes on a vehicle, the combination of a Wheatstone Bridge arrangement for each control circuit, each bridge arrangement having a fixed resistor as one branch thereof, a second branch including a fixed resistor, a third branch including the corresponding control circuit, a fourth branch including a variable resistor, electrical means responsive to the balanced condition of all said bridge arrangements to effect an intentional unbalanced condition thereof by alternatively intentionally short-circuiting either the said one branch and said third branch of each bridge arrangement simultaneously or said second branch and said fourth branch of each bridge arrangement simultaneously, and responsive to the intentional unbalanced condition thereof to restore the balanced condition thereof as long as no fault occurs on said brake control circuits, and means controlled by said electrical means for effecting an indication of the integrity of the brake control circuits.

CLAUDE M. HINES.

REFERENCES CITED

The following references are of record in the file of this patent:

UNITED STATES PATENTS

| Number | Name | Date |
|---|---|---|
| 2,052,190 | Miller et al. | Aug. 25, 1936 |
| 2,055,563 | Sorensen et al. | Sept. 29, 1936 |
| 2,091,007 | McCune | Aug. 24, 1937 |
| 2,276,706 | Sorensen et al. | Mar. 17, 1942 |
| 2,478,000 | Miller | Aug. 2, 1949 |